(12) United States Patent
Chamberlain

(10) Patent No.: US 6,438,749 B1
(45) Date of Patent: Aug. 20, 2002

(54) METHOD AND SYSTEM FOR RESTORING A COMPUTER TO ITS ORIGINAL STATE AFTER AN UNSUCCESSFUL PATCH INSTALLATION ATTEMPT

(75) Inventor: Benjamin C. Chamberlain, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/262,169

(22) Filed: Mar. 3, 1999

(51) Int. Cl.$^7$ .............................................. G06F 9/445
(52) U.S. Cl. ............................ 717/174; 714/2; 714/15
(58) Field of Search ..................... 717/11, 168–178; 703/23; 707/8, 203, 206; 714/2, 7, 6, 15; 711/162, 133

(56) References Cited

U.S. PATENT DOCUMENTS

| | | | | |
|---|---|---|---|---|
| 5,966,730 A | * | 10/1999 | Zulch | 711/162 |
| 6,073,214 A | * | 6/2000 | Fawcett | 711/133 |
| 6,161,218 A | * | 12/2000 | Taylor | 717/174 |
| 6,170,065 B1 | * | 1/2001 | Kobata et al. | 714/7 |
| 6,199,204 B1 | * | 3/2001 | Donohue | 717/178 |
| 6,202,207 B1 | * | 3/2001 | Donohue | 717/173 |

OTHER PUBLICATIONS

Kelly, M., "Gain Control of Application Setup and Maintenance with the New Windows Installer," *Microsoft Systems Journal*, Sep. 1998, pp. 15–27.

* cited by examiner

Primary Examiner—Tuan Q. Dam
Assistant Examiner—Hoang-Vu Antony Nguyen-Ba
(74) Attorney, Agent, or Firm—Christensen O'Connor Johnson Kindness PLLC

(57) ABSTRACT

A system, method and computer-readable medium for creating patch rollback scripts for operations performed by an installer program module. A patch rollback script may be used to reverse an action of an installer program module so that a user's machine is restored to its original state, i.e., the state before the installer program module began performing patch operations. In performing patch operations, the installer program module typically generates patch installation script records of specific actions that are to be performed to a particular machine with regard to patch installation data. During the processing of each patch installation script record, an inverse record is created, known as a patch rollback script record. When installing or modifying a file, if there is no file with the same name in the same location stored on the machine, a patch rollback script record describing how to delete the file is stored. However, if an old file stored in the same location does exist, the old file is backed up to another location and a patch rollback script record is saved describing how to copy the old file back to its prior location on the machine.

16 Claims, 9 Drawing Sheets

Header (Signature=1397708873, Version=28, Timestamp=0, LangId=0,,ScriptType=1, ScriptMajorVersion=20, ScriptMinorVersion=0)
ActionStart(Name=PatchFiles,Description=Patching files,Template=File: [1], Directory: [2], Size: [3])
PatchApply(PatchName=word.exe,TargetName=E:\tempWord.exe,\
PatchSize=35895,TargetSize=223824,PerTick=0,IsCompressed=0,PatchAttributes=0)
FileCopy (SourceName=e:\source\speller.exe, DestName=e:\test\speller.exe, Attributes=0, Filesize=100, version=1.0.0.0,Language=1033, InstallMode=58982400, PerTick=20, IsCompressed=0,,,,)
RegOpenKey (Root=-2147483646, Key=Software\Microsoft\Test,)
RegAddValue (Name=TestName, Value=TestValue)
End (Checksum=0, ProgressTotal=0)

```
Header (Signature=1397708873, Version=28, Timestamp=620460155, LangId=0,,
ScriptType=2, ScriptMajorVersion=20, ScriptMinorVersion=0)
ActionStart(Name=PatchFiles,Description=Patching files,Template=File: [1], Directory:
[2], Size: [3])
FileRemove(,FileName=E:\Config.Msi\PO65D.tmp)
RegisterBackupFile(File=E:\Config.Msi\3ba69f8f.rbf)
FileCopy(SourceName=E:\Config.Msi\3ba69f8f.rbf,DestName=E:\temp\blue23\Color\
Word.exe,Attributes=32800,FileSize=183572,,,InstallMode=4194308,PerTick=0,IsCompress
ed=0,,VerifyMedia=0,,)
FileCopy(SourceName=E:\temp\Word.exe,DestName=E:\Config.Msi\
PO65D.tmp,Attributes=32,FileSize=223832,,,InstallMode=4194308,PerTick=0,IsCompresse
d=0,,VerifyMedia=0,,)
RegisterBackupFile (File=e:\Config.Msi\5b9f584d.rbf)
FileCopy (SourceName=e:\Config.Msi\5b9f584d.rbf,DestName=e: \test\speller.exe,
Attributes=32, FileSize=9,,, InstallMode=4194308, PerTick=0, IsCompressed=0,,
VerifyMedia=0,,)
FileRemove (, FileName=e: \test\speller.exe)
RegOpenKey (Root=-2147483646, Key=Software\Microsoft\Test,)
RegAddValue (Name=TestName, Value=OldValue)
RegRemoveValue (Name=TestName, Value=TestValue)
End (Checksum=0, ProgressTotal=0)
```

METHOD AND SYSTEM FOR RESTORING A COMPUTER TO ITS ORIGINAL STATE AFTER AN UNSUCCESSFUL PATCH INSTALLATION ATTEMPT

RELATED APPLICATIONS

This application is related to the following U.S. Patent Applications:

U.S. patent application Ser. No. 09/158,125, entitled "Use of Relational Databases for Software Installation," filed Sep. 21, 1998; and U.S. patent application Ser. No. 09/261,864 entitled "System and Method for Patching an Installed Application Program," which was filed concurrently with and is assigned to the same assignee as this application.

FIELD OF THE INVENTION

This invention relates to installer program modules for installing a patch to a computer program module on a computer. More particularly, this invention relates to a method and system for restoring a computer to its original state after an unsuccessful patch installation attempt of an application program module by an installer program module.

BACKGROUND OF THE INVENTION

Installer programs are used by users to install application program modules on a computer. Installer programs can also be used to upgrade or patch an installed application program module. A patch is a minor modification to an application program module, whereas an upgrade is a major change to an application program module. One such installer program is Microsoft Windows Installer, developed by Microsoft Corporation, Redmond, Wash. For a description of Microsoft Windows Installer, see Kelly, Mike, "Gain Control of Application Setup and Maintenance with the New Windows Installer", *Microsoft Systems Journal,* pp. 15–27, September 1998.

Sometimes, errors may occur when an installer program module is installing a patch to an application program module on a computer. For example, a user may attempt to download an upgrade or a patch to an application program module while connected to the Internet via a modem. The modem connection may become disconnected at some point after the download has begun. The user may attempt to reconnect to his Internet service provider and restart the download. However, without reconnecting to the Internet and restarting the download, the user's computer may be left in a state such that the application program module that the user was attempting to upgrade or patch is unusable. Thus, the user may wish to return his computer to its state prior to the download attempt. However, this is not an option using prior installer program modules. Typically, prior installer program modules delete files and save updated files such that it is impossible to return the computer to its previous state.

At times, a patch installation does not fail, but instead is aborted by the user. For example, a user may terminate a patch installation before it is complete, such as by selecting a Cancel button. The user may wish to return his computer to the state it was in prior to the aborted patch installation. Thus, there is a need for a method and system for returning a computer to the state it was in prior to a failed or aborted installation.

After a failed or aborted patch installation attempt, the user may want to begin the patch installation again at the point that the patch installation failed or was aborted. Using prior installer program modules, a patch installation starts from the beginning and must be completed entirely at one time. In other words, even if most of the patch installation process has been completed in a prior failed patch installation attempt, the entire patch installation must be performed in a second installation or patch installation attempt. Thus, there is a need for an installer program module that allows a user to begin a patch installation at the point of failure of a prior failed patch installation so that dialogs requesting information already entered in a prior patch installation attempt may be bypassed.

Sometimes, patch installations of application program modules are performed by administrators deploying the application program module over a network. These administrators are not able to return the machines on the network to their previous state should a patch installation fail. Thus, there is a need for an installer program module that allows a network administrator to deploy an application program module to machines on a network while allowing for the return of the machines to a previous state should a patch installation failure or abortion occur.

Thus, there is a need for a method and system for patching an application program module that returns a computer to the state it was in prior to a failed or aborted patch installation. There is a further need for a method and system for patching an application program module that allows a user to begin a patch installation at the point of failure of a prior failed patch installation. There is still a further need for a method and system for patching an application program module that allows a network administrator to patch the application program module to machines on a network while allowing for the return of the machines to a previous state should a patch installation failure or abortion occur.

SUMMARY OF THE INVENTION

The present invention satisfies the above described needs by providing a method and system for "rolling back" a computer, i.e., restoring a computer to its original state after a failed or aborted patch installation attempt of an application program module. In one aspect, a rollback script may be used to reverse an action of an installer program module so that a user's machine is restored to its original state, i.e., the state before the installer program module began performing operations.

In performing operations, the installer program module typically generates patch installation script records of specific actions that are to be performed to a particular machine with regard to patch installation data. During the processing of each patch installation script record, an inverse record is created, known as a patch rollback script record. When installing a file, if there is no file with the same name in the same location stored on the machine, then a patch rollback script record describing how to delete the file is stored. However, if an old file stored in the same location does exist, then the old file is backed up to another location and a patch rollback script record is saved describing how to copy the old file back to its prior location on the machine.

In another aspect, the present invention is a user interface displayed to the user when "rolling back" a patch installation operation. The user interface may include a rollback bar with a number of level indicators. The level indicators appear in the rollback bar and are typically rectangles that are removed as the patch rollback operation is completed. When the patch rollback operation is completed, there are typically no level indicators displayed in the rollback bar.

In still another aspect, the present invention is a method for determining whether to enable "rollback". The cost of patching an application program module and the cost of storing corresponding patch rollback script records and corresponding backed-up patch rollback files is determined. It is determined whether the cost of patching the application program module and the cost of storing the patch rollback script records and backed-up patch rollback files is greater than the available disk space of the computer. If so, then the application program module is patched while storing the patch rollback script records and backed-up patch rollback files. In other words, "rollback" is enabled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A is a textual representation of a patch script record in accordance with an embodiment of the present invention;

FIG. 5B is a textual representation of a patch rollback script record in accordance with an embodiment of the present invention;

DETAILED DESCRIPTION OF THE PREFERRED EMBODIMENT

Figure 1:
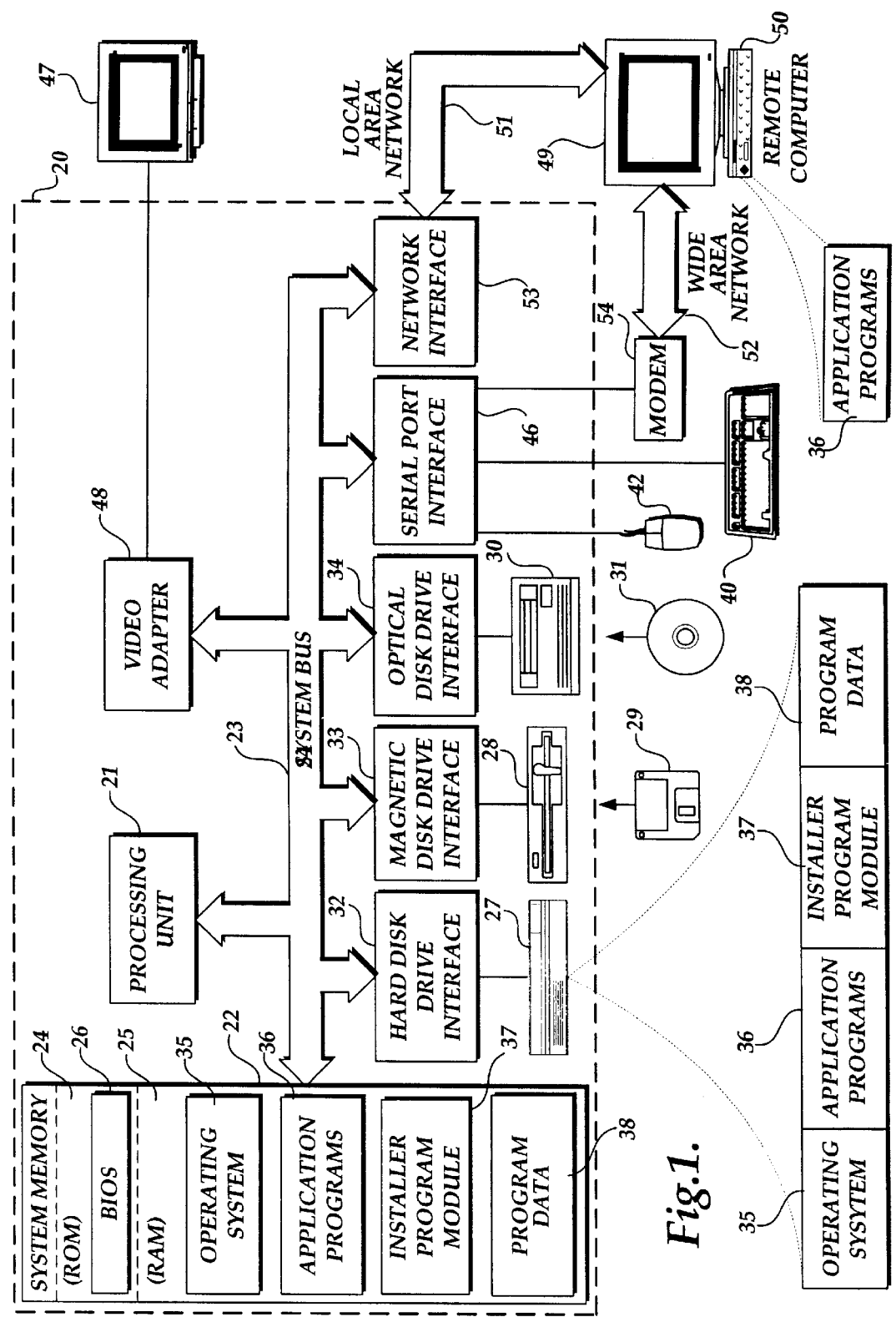
FIG. 1 is a block diagram of a computer that provides the exemplary operating environment for the present invention.

The present invention is directed to a method and system for restoring a computer to its original state after a failed or aborted patch installation attempt of an application program module. In one embodiment, the invention is incorporated into a preferred installer program module entitled "WINDOWS INSTALLER", marketed by Microsoft Corporation of Redmond, Wash. Briefly described, the preferred installer program allows a user to patch application program modules on a computer. The preferred installer program module includes a "rollback" aspect which allows the user to restore his computer to its original state should a patch installation of a program module fail or be aborted. The rollback aspect is provided as a recovery mechanism in the event of a failed patch installation. Before any operation is performed, the preferred installer program module enables the rollback aspect. If a failure should occur, the preferred installer program module can provide the user with an opportunity to resume where the patch operation left off or "rollback" to the state of the machine prior to initiation of the patch operation.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an installer program module that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an installer program module 37, program data 38, and other program modules (not shown). The installer program module 37 may include a rollback aspect that will be described later.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having briefly described the exemplary operating environment, a functional block diagram of a computer environment making use of an installer program module constructed in accordance with an exemplary embodiment of the present invention will be discussed below in reference to FIG. 2.

Discussion of Terminology

Before discussing FIG. 2, a brief discussion of terminology is needed. In accordance with an exemplary embodiment of the present invention, the installer program module 37 recognizes three principal elements: products, features and components. A "product" represents a single, entire application program, such as the "MICROSOFT OFFICE" application program marketed by Microsoft Corporation of Redmond, Wash. Each product has a globally unique identifier known as a Product Code which allows each product to be distinguished. Each product is made up of one or more features. A feature is a granular piece of the product that a user may choose to install or execute. Features typically correspond roughly to the functional features of the product itself, such as a "Proofing Tools" feature or a "WORD" feature. Each feature is essentially a grouping of components and may also include other features. Features need not be globally unique, and therefore may be identified by any appropriate means, such as with a textual feature identifier.

A component is a collection of resources, such as files or registry keys, that are all installed or uninstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. One resource within the component is designated as a key file. The key file may be any resource, such as a file or registry key, within the component.

Exemplary Installation Environment

Figure 2A:
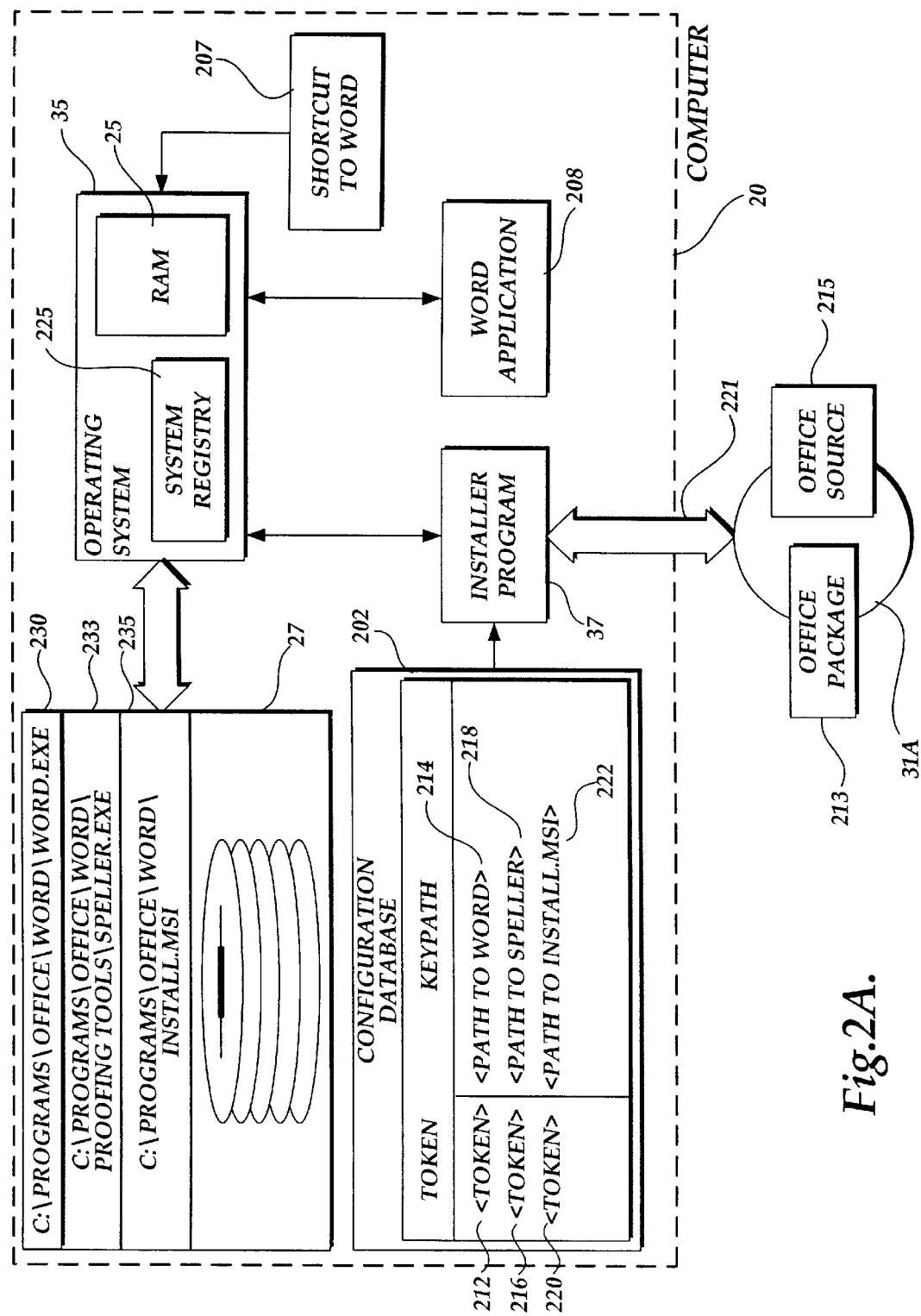
FIG. 2A is a functional block diagram of a computer environment making use of an installer application constructed in accordance with an exemplary embodiment of the present invention to install an application.
Figure 2B:
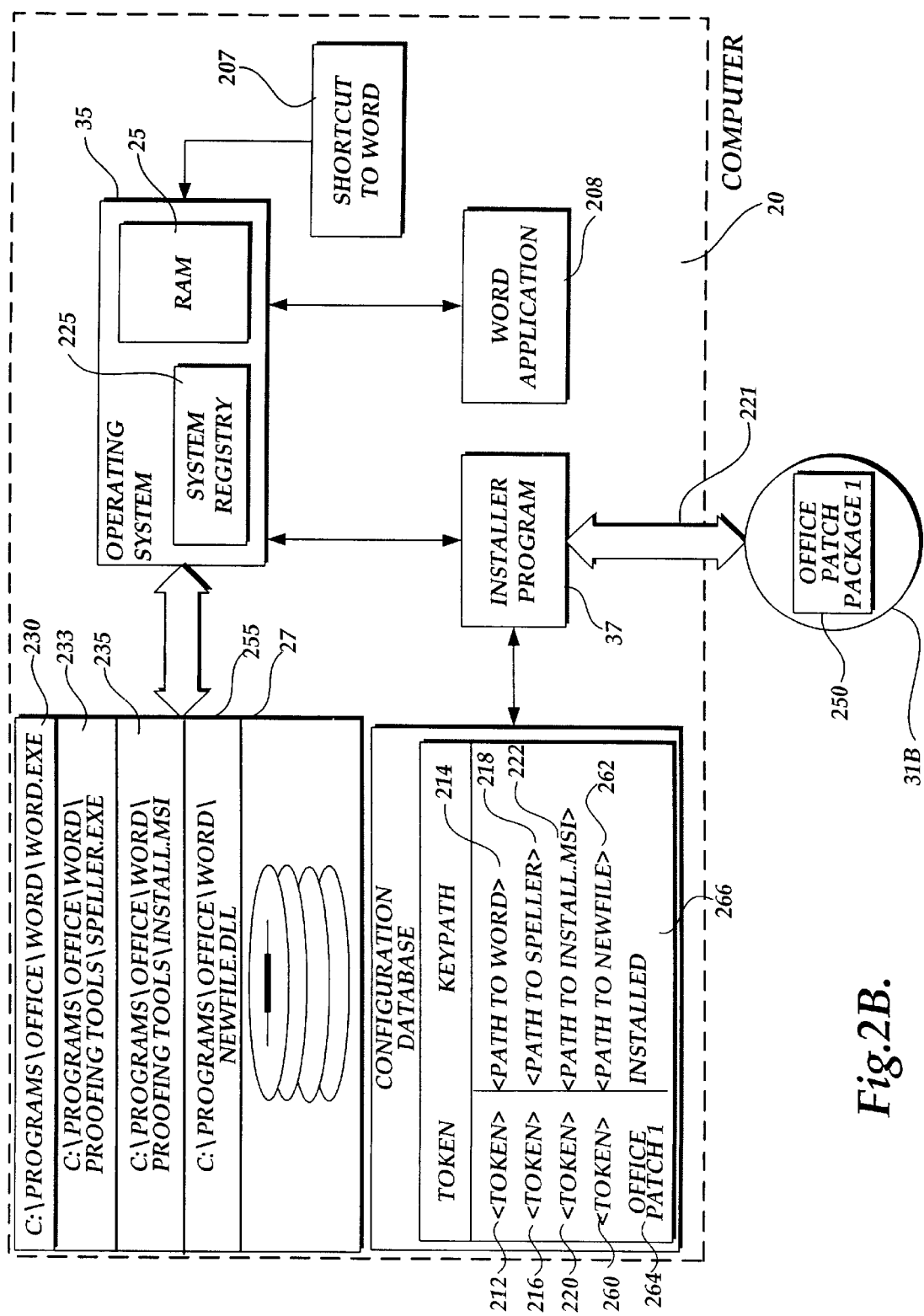
FIG. 2B is a functional block diagram of a computer environment making use of an installer application constructed in accordance with an exemplary embodiment of the present invention to patch an application.

FIGS. 2A and 2B are functional block diagrams of a computer environment making use of an installer program module 37 constructed in accordance with an exemplary embodiment of the present invention. FIG. 2A illustrates an exemplary installation of a product, and FIG. 2B illustrates a subsequent patch to the installed application of FIG. 2A.

A computer 20, such as a conventional personal computer, as shown in FIG. 1, including the installer program module 37, a configuration database 202, an operating system 35, a hard-disk drive 27, a shortcut to an application 207, and an executing application 208 is illustrated. Each of those items is described and discussed in greater detail below.

Also illustrated for the installation shown in FIG. 2A, are a package file 213 and a source 215. The package file 213 and the source 215 may reside on a CD-ROM disk 31 A accessible to the computer 20 via an optical disk drive 30. The package file 213 references the source 215 relative to the location of the package file 213 itself, so this fixed relationship requires that the source 215 reside at the same location as the package file 213. For instance, the source 215 may reside on CD-ROM disk 31A and the package file 213 may reside on remote computer 49 accessible via local area network 51 or via wide area network 52. The package file 213 and the source 215 are discussed in further detail below. The functionality and construction of the installer program module 37 is best described by example, through the installation, patching and execution of a product.

Example of Installation Procedure

To begin the example, a user initiates the installation of a product, such as the "MICROSOFT OFFICE" application program. Initiating the installation may constitute the act of inserting CD-ROM disk 31A in optical disk drive 30, or the act of executing a remote startup script over a network connection, or any other means of initiating the installation. Once the installation is initiated, the installer program module 37 assumes control of processing.

The installer program module 37 begins the installation by reading the package file 213 into memory, such as RAM 25. The package file 213 is unique to the product and is essentially a database that describes, among other things, the relationships between the features, components, and resources of the product. The package file 213 may include the unique identifiers assigned to each of the features and components of the product.

The installer program module 37 reads the package file 213 and uses the information stored within to determine the installation operations that must be performed for the product. For instance, the installer program module 37 may display a dialog box which presents the user with the option of selecting which features of the product to install. The user may be presented with the option of selecting a "WORD" feature, an "EXCEL" feature, and a "Proofing Tools" feature. The user may then select which features to install to the computer 20. As discussed above, a feature is a grouping of components, and the components identify the actual resources to be installed to the computer 20. Accordingly, once the user has selected the desired features of the product, the installer program module 37 resolves those features into a listing of components to be installed.

The source 215 contains the files. Other resources such as registry keys are described completely in the package file and require no external source information. The source 215 may also include a reference table to identify the associations between the resources and the components. Those components making up the selected features are copied from the source 215 to an appropriate location on the computer 20, such as to the hard-disk drive 27 or to a system registry 225 maintained by the operating system 35. As mentioned above, a component is a collection of resources, such as files, shortcuts, or registry keys. Those skilled in the art will recognize that the phrase "reading the component" may actually refer to reading the resources associated with the component. Likewise, the phrase "writing the component" may refer to writing the resources associated with the component. However, for simplicity only, this discussion may use the terms reading, writing, or copying components interchangeably with performing those actions on the underlying resources.

The appropriate location for a component on the computer 20 may depend upon the type of resources associated with the component. For instance, if the component includes files, the component may be stored in the file system of the hard-disk drive 27. However, if the component includes registry keys, the component may be stored in the system registry 225. In addition, a component may include both files and registry keys, in which case files are stored in the file system of the hard-disk drive 27 and the registry keys are stored in the system registry 39. If the user identifies a particular location within the file system of the hard-disk drive 27 for a feature, the installer program module 37 will write the files of components associated with that feature to that particular location.

When a component is written to the appropriate location, the installer program module 37 creates an entry in the configuration database 202 corresponding to the component. The entry includes an identifier for the component, termed a token, and a keypath for the component. The token includes the Product Code of the product installing the component and the Component Code of the component. Those skilled in the art may appreciate that a usage counter may be included to identify the number of features requiring a component. For instance, if more than one feature requiring a component is installed, the usage counter may prevent the component from being deleted if only one such feature is uninstalled.

The keypath entry may be a path in the file system where the component is actually stored. For instance, in the disclosed example, the product installed may include a "WORD" feature having a "WORD" executable component. The "WORD" executable component may have the key file "word.exe" 230. The "WORD" feature may also include a "Proofing Tools" feature, which is actually a sub-feature. As mentioned above, a feature may include subfeatures. The "Proofing Tools" feature may include a Spelling Component. The Spelling Component may have the key file "speller.exe" 233.

Continuing with the example, the "WORD" executable component may be installed to the location on the hard-disk drive 27 identified by the path "C:\Programs\Office\Word\." Accordingly, the word.exe key file 230 is written to that location, and an entry in the configuration database 202 includes a token 212 identifying the "WORD" executable component and the keypath 214 to the word.exe key file 230. In a similar manner, the Spelling Component may be written to the path "C:\Programs\Office\Word\Proofing Tools\," and an entry in the configuration database 202 may be created with a token 216 identifying the Spelling Component, and a keypath 218 to the speller.exe key file 233. Likewise, the installation file, install.msi 235 may be written to the path "C:\Programs\Office\Word\," and an entry in the configuration database 202 may be created with a token 220 identifying the install.msi file 235, and a path 222 to the install.msi file.

The installer program module 37 continues with the installation process until all of the components making up the selected features are written to the appropriate location on the computer 20. When all of the components are written, installation is complete and the configuration database 202 is populated with an entry for each installed component, as well as an entry for the installation file. Each entry includes an identifier for the component (the token) and a keypath identifying the location to which the component is stored.

Example of Patch Installation Procedure

To begin the example shown in FIG. 2B, a user initiates a patch installation of an installed product, such as the "MICROSOFT OFFICE" application program installed in FIG. 2A. Initiating the patch installation may constitute the act of inserting CD-ROM disk 31B in optical drive 30, or the act of executing a remote start-up script or a network connection, or any other means of initiating the patch installation. Once the patch installation is initiated, the installer program module 37 assumes control of processing. The installer program module 37 begins the patch installation by reading the patch package 250 into memory, such as RAM 25. The patch package 250 is essentially instructions that describe how to modify an installed product to create an updated version of the product. Because the installation of a patch does not per se form part of this invention, such installation is not described here. Rather, attention is directed to U.S. patent application Ser. No. 09/261,864, titled "System and Method for Patching an Installed Application Program", filed concurrently herewith.

The installer program module 37 reads the patch package 250 and uses the information stored within the patch package 250 to determine the patch installation operations that must be performed for the product, preferably in the manner described in the above-identified patent application. For instance, the installer program module 37 may be instructed to apply a set of patch bits contained in the patch package 250 to an installed file, such as word.exe 230, or to insert a file, for example, newfile.dll 255. Similar to the installation shown in FIG. 2A, a patch installation also updates the configuration database 202. The configuration database 202 contains the status of installed applications. For example, the configuration database 202 indicates what patches are installed. In the example illustrated in FIG. 2B, the patch derived from patch package 250 has been installed, as indicated in the keypath 266. The configuration database 202 has also been updated to include an entry (i.e. token 260 and keypath 262) for the new file, newfile.dll 255

Example of Product Execution

The following discussion gives an overview of the functionality of the installer program module 37 once the product, or patched to a product is installed. To review, the installer program module 37 installed the features of the product selected by the user at installation. The components making up those selected features were written to appropriate locations on the computer 20. For instance, a "WORD"

executable component and a Speller Component were written to the file system of the hard-disk drive 27. As discussed above, installing those components may include writing the key files of those components to a keypath in the file system of the hard-disk drive 27.

Also during installation, a shortcut 207 to the "WORD" executable component was created. The shortcut 207 is an operating system service that allows indirect access to a resource stored on the hard-disk drive 27. A shortcut is sometimes referred to as an alias. The shortcut 207 is generally presented to the user as an icon or file which, when activated, launches an executable file associated with the shortcut 207. In the disclosed example, the shortcut 207 is associated with the "WORD" executable component such that activating the shortcut 207 causes the operating system 35 to launch the key file associated with the "WORD" executable component, in this case the word.exe executable file 230.

When the user activates the shortcut 207, the operating system 35 first instantiates a shell or process within which the executable file will execute. In accordance with the disclosed embodiment, the shortcut 207 then queries the installer program module 37 for the path to the executable file associated with the shortcut 207, in this case the path to the word.exe executable file 230. The shortcut 207 may query for the path by passing to the installer program module 37 a "Provide_Component" call with a token identifying the Word Executable Component. In response to the Provide_Component call, the installer program module 37 queries the configuration database 202 for the keypath associated with the token. The installer program module 37 then returns the keypath to the component that is the target of the shortcut 207, which in turn prompts the operating system 35 to execute the word.exe executable file 230 at the location identified by the keypath. As discussed above, the word.exe executable file 230 is stored on the hard-disk drive 27 under the folder "C:\Programs\Office\Word\."

The operating system 35 executes the word.exe executable file 230 from the location identified by the keypath. The word.exe executable file 230 then assumes control of the shell instantiated by the operating system 35. While the word.exe executable file 230 is executing, it is referred to as the "WORD" application 208. The "WORD" application 208 may then perform a startup procedure and continue loading. For instance, the "WORD" application 208 may issue a series of "Query_Feature_State" calls to the installer program module 37 to identify which features of the "WORD" application 208 are installed. In response to such a call, the installer program module 37 may query the configuration database 202 to identify whether a particular feature of the "WORD" application 208 is installed, and return that information to the "WORD" application 208. The "WORD" application 208 may perform several such calls in order to populate a menu bar or toolbar of the "WORD" application 208. Once the startup procedure is complete, the "WORD" application 208 is available for use by the user.

During operation, the user may select a particular feature of the "WORD" application 208 for activation. For instance, the user may select a "spell check" option from the menu bar or toolbar of the "WORD" application 208. In response to such a selection, the "WORD" application 208 may query the installer program module 37 for the path to the component or components necessary to support the feature. For instance, in the disclosed example, a Spelling Component may be necessary to support the feature associated with the "spell check" option of the "WORD" application 208. In that case, when the user selects "spell check," the "WORD" application may pass a "Provide_Component" call to the installer program module 37 along with a token identifying the Spelling Component.

In response to the Provide—Component call, the installer program module 37 may verify the installed state of the calling feature identified in the token, and provide the keypath to the key file associated with the component identified in the token. In this example, the key file of the Spelling Component is the speller.exe key file 233. Consequently, when the installer program module 37 receives a Provide_Component call with a token identifying the Spelling Component, the installer program module 37 queries the configuration database 202 for the keypath associated with that token. The installer program module 37 then returns the keypath to the "WORD" application 208, which then instructs the operating system 35 to execute the speller.exe key file 233 at the location identified by the keypath. Once the operating system 35 has launched the speller.exe key file 233, the Speller Component is available to the "WORD" application 208. In this manner, the "WORD" application 208 may query the installer program module 37 each time the user attempts to activate another feature, and the installer program module 37 returns the keypath for the appropriate component.

The foregoing has been a general overview of the functionality of an installer program module 37 that may benefit from an exemplary embodiment of the present invention. The discussion will now explain in greater detail additional inventive aspects of the patch rollback aspect of the installer program module 37.

Patch Rollback Aspect of the Installer Program Module

The installer program module 37 includes a patch rollback aspect that provides a method for restoring a computer to its original state after a failed or aborted patch installation attempt of an application program module. For example, if a patch installation is canceled or a patch installation fails, then the patch rollback aspect of the present invention restores all the information to the computer that was on the computer before the patch installation began, even if that information may have been removed or changed during the patch installation.

For example, suppose a user is trying to patch version 2.0 of an application to create patched version 2.0.1. During installation of the patch, the patch installation may fail or be canceled by the user so that some files of patched version 2.0.1 are installed on the user's computer along with the remaining files of unpatched version 2.0. Thus, patched version 2.0.1 is left in an unusable state. Moreover, unpatched version 2.0 is also typically left in an unusable state because even a partial patch installation of version 2.0.1 often erases or corrupts necessary files.

The patch rollback aspect allows a user to "rollback" his or her computer to the state it was in prior to the failed or aborted patch installation. The patch rollback aspect "rolls back" the information on the computer to the state it was in prior to a failed or aborted patch installation. In other words, with regard to the above-described example, patch rollback allows a user to restore all of the version 2.0 information to his or her computer so that the application is still usable.

Figure 3:
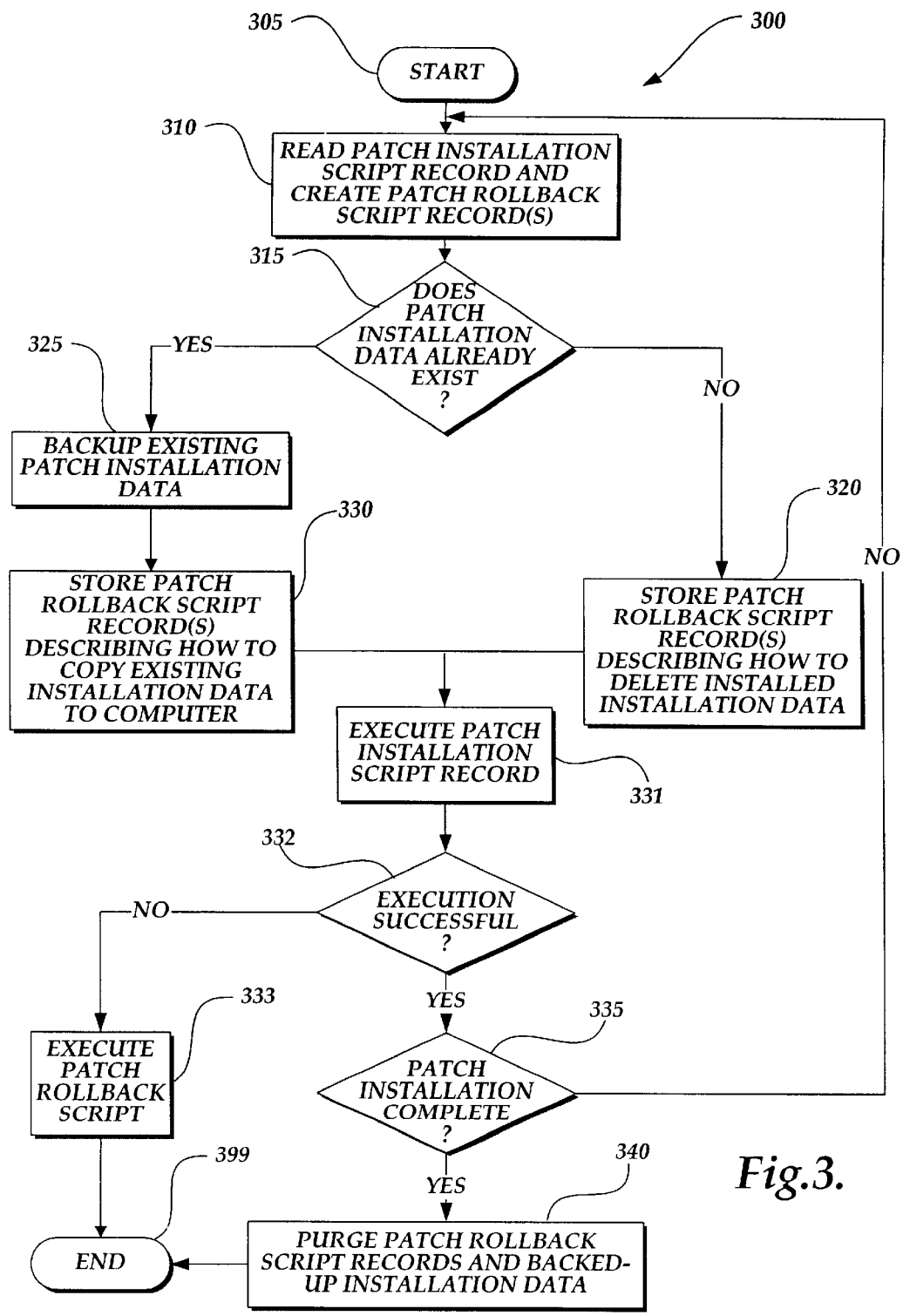
FIG. 3 is a flowchart illustrating a method for restoring a computer to its original state after a failed or aborted patch installation attempt of an application program module in accordance with an embodiment of the present invention.

Referring now to FIG. 3, a flowchart illustrating a method 300 for restoring a computer to its original state after a failed or aborted patch installation attempt of an application program module in accordance with an embodiment of the present invention will be described. Those skilled in the art will appreciate that this exemplary embodiment is a computer-implemented process that is carried out by the computer in response to input from the user and instructions provided by a program module.

At step 305, the method 300 begins and proceeds to step 310 where a patch installation script record for patching a part of the application program module is read, or processed. The original decision to install a patch may be made in a variety of ways. For example, the user may trigger a patch installation, an application program module may trigger a patch installation, the operating system may trigger a patch installation, or the installer program module may trigger a patch installation in response to certain requests made by the operating system, application program module, or user. Regardless, the patch installation script operations are typically generated by the installer program module. These instructions are generally in the form of a patch installation script. A patch installation script is a set of patch installation script records. These patch installation script records typically are instructions to remove or add certain patch installation data, such as files, etc. For example, one patch installation script record may cause a certain file to be added to the user's computer, a second patch installation script record may cause certain files to be removed from the user's computer, and a third patch installation script record may be to apply a set of bits (i.e., perform a binary patch) to modify an existing file on the user's computer.

As described above, a patch installation script typically includes a set of records known as patch installation script records describing specific actions to apply to a particular machine. For example, the patch installation script may contain records describing the following actions: writing a registry value with the name "TestName" and data "TestValue" under key "Software\Microsoft\Test" modifying a file named "word.exe", using a specified set of patch bits, and installing a file named "speller.exe". During the processing of each patch installation script record, the preferred installer program module creates one or more inverse records, called a patch rollback script records, and analyzes the patch installation script record at step 310. The generation and content of installation script records is further described in U.S. Pat. Application Ser. No. 09/158,125, entitled "Use of Relational Databases for Software Installation", filed Sep. 21, 1998 and assigned to a common assignee. The installation script records, e.g., install files, add registry keys, etc., can also be used as patch installation script records. Patch installation script records also include directions to modify existing files, and are further described below.

After a patch installation script record is analyzed to create one or more patch rollback script records at step 310, the method 300 proceeds to decision step 315. It is determined whether the patch installation data in the processed patch installation script record already exists at decision step 315. As mentioned above, patch installation script records typically are instructions to remove, add or modify certain patch installation data, such as files. Decision step 315 is a determination of whether that patch installation data already exists, such as whether another version of the file being installed already exists.

If, at decision step 315, it is determined that the patch installation data in the processed patch installation script record does not already exist, then the method 300 proceeds to step 320. However, if, at decision step 315, it is determined that the patch installation data in the processed patch installation script record already exists, then the method proceeds to step 325.

At step 320, the patch rollback script record created at step 310 is stored. The patch rollback script record typically includes instructions on how to delete the installed patch installation data of the patch installation script record processed at step 310. For example, if there is no value named "TestName" under the "Software\Microsoft\Test" key, then the patch rollback script record describes how to remove the "TestName" value. The method then proceeds to step 331.

Returning now to decision step 315, if it is determined that the data to be patched already exists, the method proceeds to step 325. At step 325, the existing data to be patched is stored in another location. For example, if there is already a value named "foo", the patch rollback script record saves, or backs up, the existing value data so that it can be restored later, if necessary. It should be understood that if the data that needs to be backed up is a file, then the file needs to be backed up at a different location than its current storage location. However, if the data is simply a registry key or shortcut, for instance, the patch rollback script record stored at step 330 (described below) fully describes the information needed and the patch rollback script record is sufficient. The method 300 then proceeds to step 330. At step 330, a patch rollback script record is stored. Typically, the patch rollback script record stored at step 330 includes instructions describing how to copy the existing patch installation data, i.e., the backed-up patch installation data, to its prior location and delete the installed patch installation data. The method 300 then proceeds to step 331.

At step 331, the patch installation script record is executed to perform the patch installation function defined by the patch installation script record. The method then proceeds to decision step 332.

At decision step 332, it is determined whether the patch installation script record executed successfully. If so, the method proceeds to decision step 335. However, if the patch installation script record does not execute successfully, the method proceeds to step 333.

At step 333, the patch rollback script, including all of the patch rollback script records, is executed to "rollback" the unsuccessful patch installation. The method then ends at step 399.

Returning to decision step 332, if the patch installation script record is executed successfully, the method proceeds to decision step 335.

At decision step 335, it is determined whether the patch installation operation is complete. If not, the method returns to step 310 and the next patch installation script record is processed and the next patch rollback script record is created. However, if at decision step 335, it is determined that the patch installation operation is complete, the method 300 proceeds to step 340.

At step 340, the patch rollback script records and backed-up patch installation data are purged. The method then ends at step 399.

Thus, as described above in reference to FIG. 3, when performing a patch installation, the installer program module 37 typically copies files, modifies files and writes to a registry. At each point when the preferred installer program module is about to modify the computer, such as by copying a file, modifying a file or writing a registry value, the installer program module 37 first checks to determine whether certain patch installation data, such as files are already stored on the computer.

For example, when copying a file, an embodiment of the present invention determines whether a file of that same name already exists and, if so, then it copies, or backs up, that existing file to another location. Typically, the file is copied to a folder called config.msi at the root of the same drive where the file was originally stored. The folder is typically marked hidden in the system so that the user never sees it. Information is stored in patch rollback script records that will allow the preferred installer program module to put back the backed-up patch installation data if necessary.

Thus, while performing a patch installation, the present invention analyzes the current state of the machine and records whatever information is necessary to return to that state if necessary. When the patch installation is canceled or otherwise fails, the present invention can restore the original state of the machine.

Patch Rollback Scripts and Patch Rollback Script Records

Typically, for any patch installation transaction, a patch installation script is generated that includes one or more patch installation script records. Each patch installation script record includes instructions for installing, modifying or performing some other action, on a certain piece of installation data. For example, a patch installation script record may include instructions for modifying the file "foo.exe".

The preferred installer program module 37 is capable of creating a patch rollback script for every transaction submitted to it. The patch rollback script is a set of instructions for reversing the transaction that is submitted to the installation service. Thus, a patch rollback script is capable of reversing the actions of a patch installation script, thereby restoring a machine to its previous state, i.e., the state of the machine before the actions of the patch installation script were undertaken.

As described above, a patch installation script typically includes one or more patch installation script records. Similarly, a patch rollback script record typically includes one or more patch rollback script records. Preferably, patch rollback script records are stored in a binary format and define one or more operations to be performed.

Figure 4:
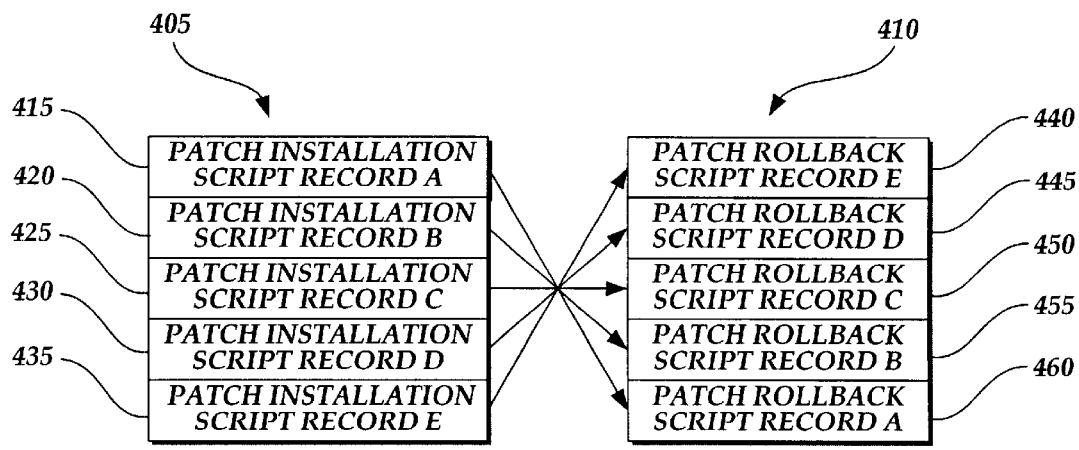
FIG. 4 is an illustration of a patch installation script and a patch rollback script.

Referring now to FIG. 4, a patch installation script 405 and patch rollback script 410 are illustrated. The patch installation script 405 includes patch installation script record A 415, patch installation script record B 420, patch installation script record C 425, patch installation script record D 430, and patch installation script record E 435. The patch rollback script 410 includes patch rollback script record E 440, patch rollback script record 4 445, patch rollback script record C 450, patch rollback script record B 455, and patch rollback script record A 460. The arrows in FIG. 4 illustrate the associations between the patch installation script records and the patch rollback script records. For example, patch installation script record A 415 is associated with patch rollback script record A 460. Thus, patch rollback script record A 460 includes instructions for reversing the operation defined by patch installation script record A 415. As further illustrated in FIG. 4, the patch installation script 405 and the patch rollback script 410 are executed from top to bottom. Thus, when rolling back a patch installation operation, patch rollback script record E 440 is executed first when "rolling back" the patch installation operation performed by installation script 405.

Each patch rollback script record typically is a stream of data containing an opcode, an argument count, and an array of arguments. The opcode is a number which corresponds to the particular type of operation performed by the patch rollback script record, such as whether the operation of the patch rollback script record is to copy a file. For the preferred installer program module 37, there are approximately sixty operations that may be performed by a patch rollback script record, such as file copy, write registry value, remove file, remove shortcut, and remove registry value.

Each patch rollback script record also includes an argument count which is an indicator of the size of the remainder of the operation, i.e., the number of bits that follow the argument count. The remainder of the operation is the rest of the information needed. For example, if the operation is file copy, then the first parameter, or argument, may be the path to the folder that is copied to the file. The second parameter, or argument, may be the name of the file.

As illustrated in FIG. 5A, a textual representation of a patch installation script record 505 in accordance with an embodiment of the present invention is shown. The patch installation script record 505 modifies a file, copies a file and writes a registry value. As illustrated in FIG. 5B, a textual representation of a patch rollback script record 510 in accordance with an embodiment of the present invention is shown. The patch rollback script record 510 was generated during execution of the patch installation script record 505. In this example, an older file of the file to be copied already existed, so the patch rollback script record 510 copies back the older file and rewrites an older registry value.

Thus, it should be understood that a patch rollback script is a file containing a linear sequence of operations to perform, such as file and registry updates, configuration information updates, user interface notifications, and state information for other operations. Each operation in a patch rollback script is stored as a patch rollback script record and is created in response to an operation in a patch installation script record. For example, if a patch installation script record installs a file "foo.exe" in the folder "C:\ProgramFiles\FooWare", a corresponding patch rollback script record is created to remove this file. Should "foo.exe" already exist in "C:\ProgramFiles\FooWare" then the patch rollback script record contains information on how to restore the existing "foo.exe" from a backup location should the user choose to patch rollback the installation operation. Similar rules apply for all classes of patch installation operations and patch installation data (e.g., files, registry entries, shortcuts, etc.).

A binary format is preferably used for patch rollback script records instead of text because of efficiency, there is no need for parsing of text, and the binary format discourages manual editing of the patch rollback script records.

The data types that are preferably supported for patch rollback script records include NULL, integer, variable length string and variable length binary data. Exemplary patch rollback script data types and the length encoding are illustrated below:

| Data Type | Length Encoding |
| --- | --- |
| Null String (all types) | 0x8000 |
| 32-bit signed integer | 0x4000, integer value |
| Null Value | 0x8000 |
| Extended Size | 0xC000, 32-bit length, data array |
| Non-DBCS char string | lstrlenA( ), char array |
| DBCS char string | lstrlenA( ) + 0x4000, char array |
| Binary stream | Byte count + 0x8000, byte array |
| Unicode string | lstrlenW( ) + 0xC000, char array |

Preferably, all data in the patch rollback script records is typically stored as 16-bit integers in Intel byte ordering, with the exception of non-Unicode strings which are padded if necessary to a 16-bit boundary. The first 16-bit word of a patch rollback script record contains the opcode in the low byte and the argument count in the high byte as follows:

| Argument Count | Operation Code |
| (high byte) | (low byte) |

Preferably, each argument is preceded by a 16-bit word that specifies the data type and the length of the following argument data. The exact data representation depends upon the data type used. The maximum length of an argument is 16,383 characters. If ever a longer argument is required, the extended type value is placed in a length field followed by a 32-bit word containing the type bits as the highest bits.

Patch rollback script records are typically stored in a subfolder of a folder named "installer". The backup files that need to be saved as a part of "rollback", i.e., the files the current patch installation has overwritten or deleted, are stored in the config.msi folder on the root of each volume. By storing the backup files on the same volume on which they originally resided, the process of backing the files up is quick, because the files do not need to be physically moved anywhere. The "installer" folder is typically marked as both Hidden and System and on the Windows NT operating system, and it is typically secured to give users read-only access. Should a folder of the same name exist off of the root, but not have the hidden and/or system attributes set, or security settings on the Windows NT operating system, the attributes and security settings are added to the folder. Patch rollback script file names are generated using an internal function in the preferred installer program module 37 that guarantees uniqueness. Patch rollback script file names have a randomly generated prefix, or first 8 characters, to which an extension of ".rbs" (for RollBackScript) is appended. The preferred installer program module then checks the proposed folder for a file with the same name and, if one exists, a new prefix is generated and iterations continue until a unique name is obtained.

Backed-up patch installation data for patch rollback script records are stored in the same folder as the original ones, but are renamed using similar rules for naming patch rollback script records.

Enabling the Patch Rollback Aspect

Preferably, by default, the patch rollback aspect of the preferred installer program module 37 is enabled for the duration of a patch installation operation, assuming there is enough disk space. As soon as the patch operation completes successfully, however, the corresponding patch rollback script and any backed-up patch installation data are purged. "Rollback" applies to all patch installation operations, such as installing a file, modifying a file, installing a feature locally, changing a feature from local to source, and uninstalling a feature.

Figure 6A:
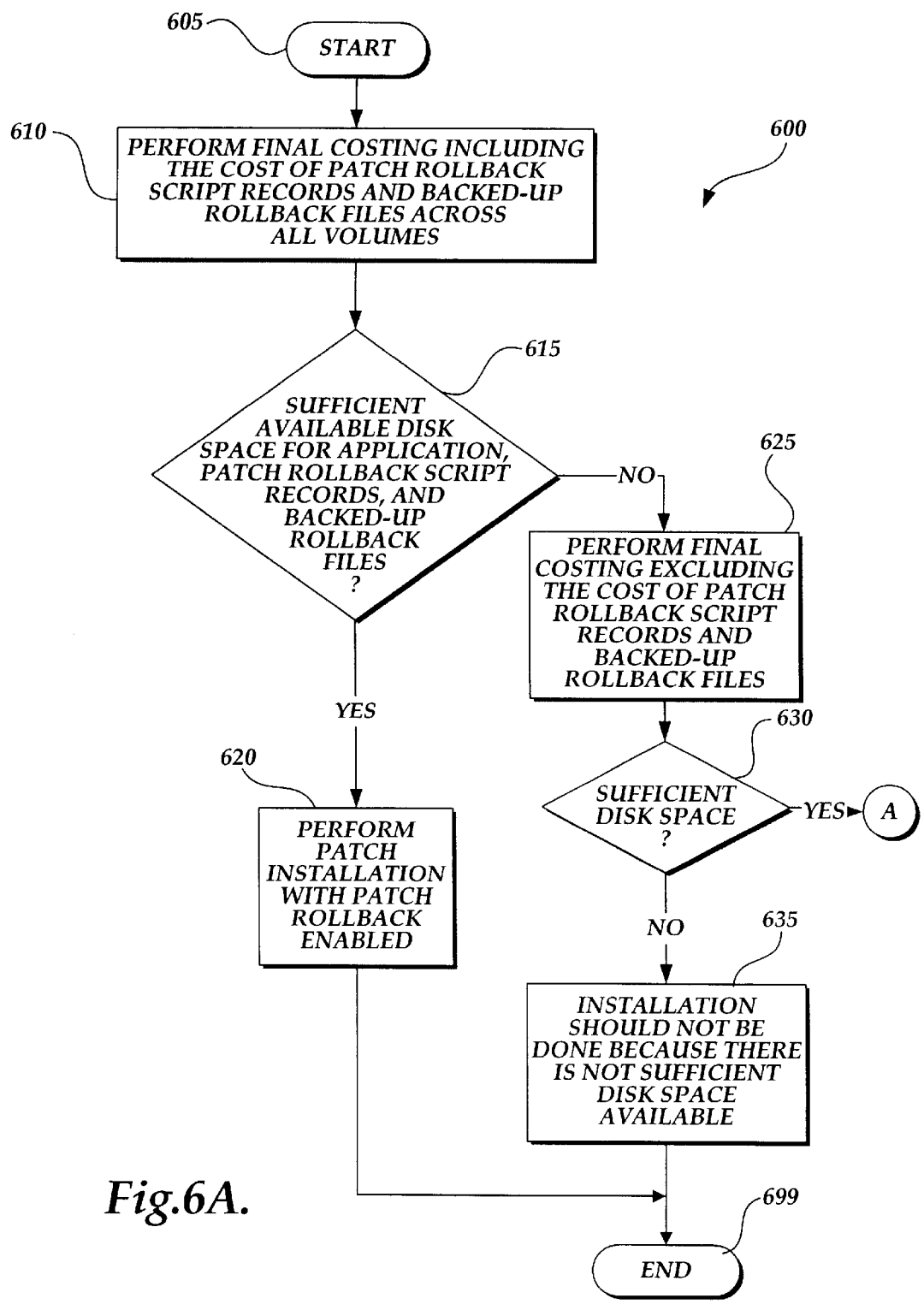
FIGS. 6A and 6B are a flowchart illustrating a method for determining whether there is enough disk space to enable the rollback aspect.

Referring now to FIG. 6A, a method 600 for determining whether there is enough disk space to enable the patch rollback aspect is illustrated in a flowchart. The method 600 starts at step 605 and proceeds to step 610. Final costing is performed at step 610. Final costing includes determining how much disk space (or cost) is needed to patch the application program module being patched and the disk space (or cost) needed to store the patch rollback script records and backed-up patch rollback files (backed-up patch installation data). The method 600 then proceeds to decision step 615.

At decision step 615, it is determined whether there is sufficient disk space for patching of the application program module and for storage of the patch rollback script records and backed-up patch rollback files. If there is sufficient disk space, the method 600 proceeds to step 620 and the patching of the application program module is performed with the patch rollback aspect enabled. The method then ends at step 699.

However, if at decision step 615 it is determined that there is insufficient disk space for patching of the application program module and storage of the patch rollback script records and backed-up patch rollback files, the method 600 proceeds to step 625.

At step 625, final costing is performed excluding the cost of storage of the patch rollback script records and backed-up patch rollback files. The method 600 then proceeds to decision step 630.

At decision step 630, it is determined whether there is sufficient disk space for patching of the application program module with the patch rollback aspect disabled, i.e., absent the patch rollback script records and backed-up rollback files. If not, the method 600 proceeds to step 635 and a dialog is displayed to the user informing the user that the patching of the application program module could not be performed because there is insufficient available disk space and the method ends at step 699.

Figure 6B:
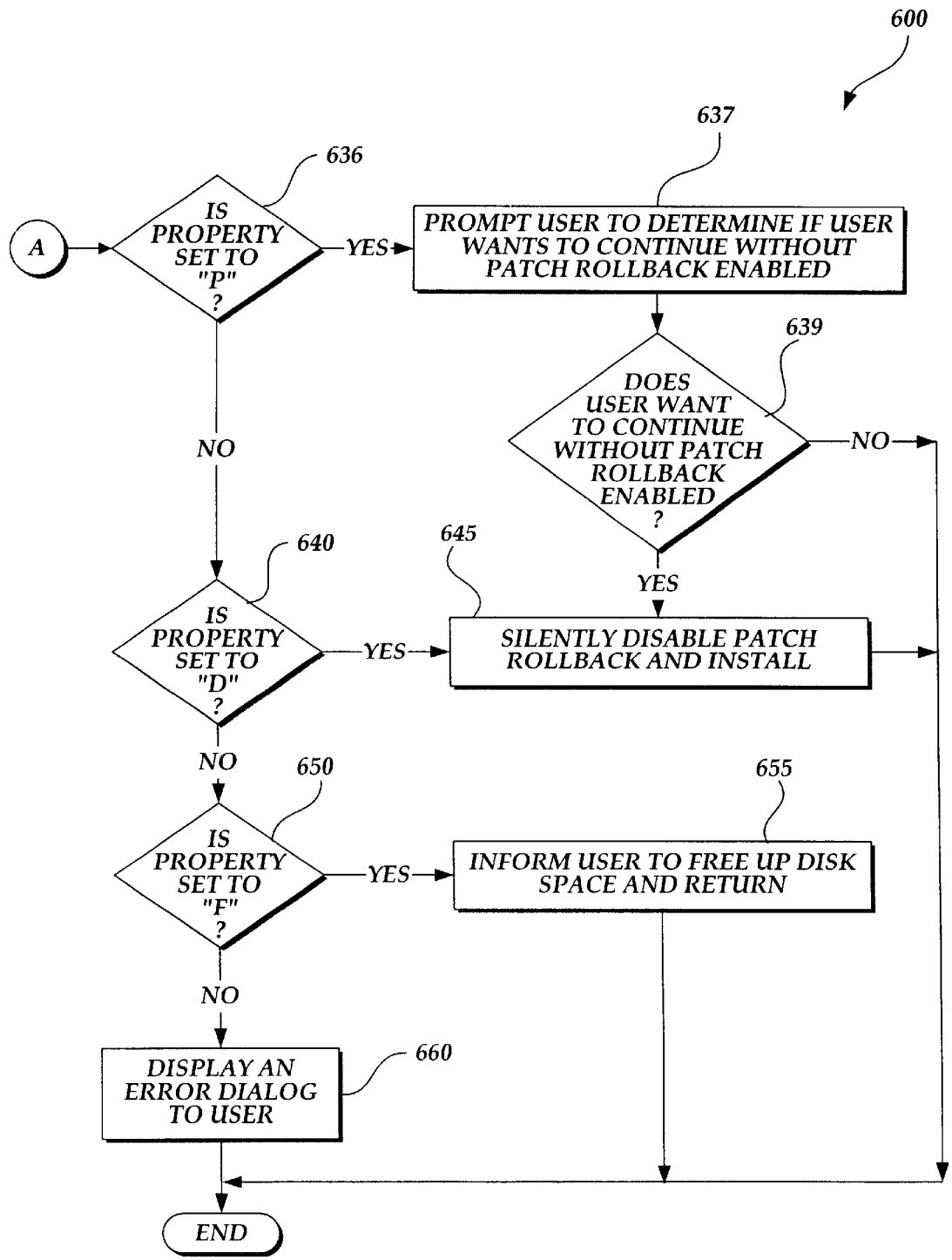

However, if at decision step 630 it is determined that there is sufficient disk space for installation of the application program module with the rollback aspect disabled, then the method 600 proceeds to decision step 636 of FIG. 6B.

At decision step 636, it is determined whether a PROMPTROLLBACKCOST property is set to the value "P". The PROMPTROLLBACKCOST property is a property that may be set by an application program module developer or system administrator to indicate whether patch installation operations may be performed with the patch rollback aspect of the installer program module disabled. If the PROMPTROLLBACKCOST property is set to "P", the method proceeds to step 637. At step 637, the user is prompted as to whether or not he or she would like to continue without patch rollback enabled. Next, at step 639, it is determined whether the user chose to continue without patch rollback enabled. If so, the method proceeds to step 645. At step 645, the patch rollback aspect is silently disabled and the application program module is patched. The method 600 then ends at step 699. If at step 639 it is determined that the user chose not to continue without patch rollback enabled, the method 600 then ends at step 699.

If at step 636 it is determined that the PROMPTROLLBACKCOST property is not set to the value "P", the method proceeds to step 640 where it is determined whether the PROMPTROLLBACKCOST property is set to the value "D". If so, the method proceeds to step 645. At step 645, the patch rollback aspect is silently disabled and the application program module is patched. The method 600 then ends at step 699.

However, if at step 640, it is determined that the PROMPTROLLBACKCOST property is not set to "D", the method proceeds to decision step 650. At decision step 650, it is determined whether the PROMPTROLLBACKCOST property is set to "F". If the PROMPTROLLBACKCOST property is set to "F", the method 600 proceeds to step 655. At step 655, a dialog informs the user to free disk space and retry the patch installation. The method then ends at step 699.

If, at decision step 650, it is determined that the PROMPTROLLBACKCOST property is not set to "F", the method proceeds to step 660. At step 660, an error dialog is displayed to the user describing that the patch installation could not be completed and asking whether the user wishes to disable the patch rollback aspect. The method ends at step 699.

Resuming an Unsuccessful or Aborted Patch Installation

When a patch installation is canceled or fails, an embodiment of the present invention allows a user to leave the patch installation in its present state and then finish the patch installation at a later time. This may be known as resuming an unsuccessful or aborted patch installation.

When the user chooses not to "rollback" an unsuccessful or aborted patch installation, then the patch rollback script records for the patch installation are saved. At a later time, when the user wishes to continue the patch installation, a second set of patch rollback script records is generated and added to the backup folder where the patch rollback script records and backed-up patch installation data are saved. The two sets of patch rollback script records are associated through special registry key entries for each patch rollback script record. Each registry key typically contains a path to a patch rollback script record so that the record may be accessed and read. Each registry key also typically contains a time and/or date that the registry key was created because it is important to keep the patch rollback script records in proper order so that "rollback" may be performed. It should be understood that patch rollback script records are typically executed from the newest patch rollback script record to the oldest patch rollback script record.

It should be understood that there are typically three situations in which deciding whether to "resume" a patch installation or "rollback" a patch installation may be important. The first of these situations is if the user cancels the installation. A second situation is if the installer program module suffers a fatal error. A third situation is if the user's computer suffers an unrecoverable system crash.

In the case of a user-initiated cancel, patch rollback script records and backed-up installation data that are required to support resuming where the patch installation left off are preserved. Typically, a confirmation dialog is displayed to the user indicating that he or she may cancel all and resume later, or continue installing. A user is typically given the opportunity to "rollback" at this point.

In the case of a fatal error of the installer program module, a user is given the opportunity to "rollback". When the fatal error occurs, typically the user is given the option to retry the patch installation and the user may be given the option to ignore the error. However, once the user decides not to ignore the error, or that the retry is not working, the user must choose cancel on an error dialog box, at which point the user is warned that "rollback" is about to occur, and then "rollback" occurs.

Patch Rollback User Interface

Figure 7:
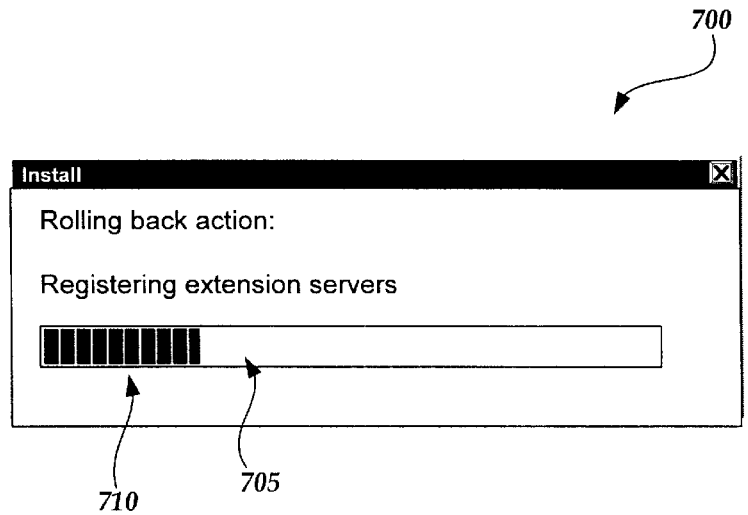
FIG. 7 is a screenshot illustrating the preferred user interface displayed to the user when "rolling back" a patch installation operation in accordance with an embodiment of the present invention.

Referring now to FIG. 7, the preferred user interface 700 displayed to the user when "rolling back" a patch installation operation is illustrated in a screenshot. The user interface 700 includes a rollback bar 705 with a number of level indicators 710. The level indicators 710 appear in the rollback bar 705 and are typically rectangles that are removed as the rollback operation is completed. When the rollback operation is completed, there are typically no level indicators 710 in the rollback bar 705.

Blocking

It should be understood that typically, if the rollback aspect of the present invention is to be enabled, a first installation of a first program module must be completed before a second installation of a second program module begins. This is because the two separate installations may affect the same files or other similar installation data. Thus, if two installations are being performed before either is complete, then the rollback scripts may cause system errors because "rolling back" one installation may incorrectly "rollback" a file or installation data that has been changed in another installation. This blocking may occur between installations, patch installations, upgrade installations, or some combination thereof.

It should be understood therefore, that as soon as an installation or patch installation is complete, all rollback scripts and backed-up files for that installation or patch installation are preferably deleted. Of course, in alternative embodiments of the present invention, patch rollback scripts and backed-up patch installation data may be sayed so that a patch installation may be "rolled back" at any time after the initial patch installation.

Thus, from the foregoing description, it will be apparent to those skilled in the art that the present invention provides a method and system for restoring a machine to its original state should any configuration task terminate prematurely, either due to a failure or due to a user requested termination. It should be further understood that the present invention provides a method for resuming a patch installation of an application program at the point where the patch installation was previously canceled. Thus, it should be understood that the present invention may ease patches of products over slow links and products that are patched from many diskettes by allowing patching to be performed in a piecemeal fashion. It should be further understood that the present invention enables a safety window during which time network administrators may deploy applications, knowing they can back out and restore the state of the machines on the network should the need arise.

It should be understood that, in one embodiment, the present invention is generic for any patch installation. In other words, any patch installation written for the preferred installer program module 37 using native operations, rather than custom operations, will automatically have the patch rollback aspect enabled.

It should be understood that the preferred installer program module has a fine level of granularity. For example, application program modules may support on-demand patching of features. For these applications, some features are faulted in while others are faulted out. Each of these faulted in or faulted out actions is a type of patch installation, or uninstallation and, thus, results in the generation of a patch rollback script and patch rollback script records.

It should be understood that although the present invention is described above with reference to a patch installation of a program module, that the present invention also applies to other operations performed by the installer program module. For example, the patch rollback aspect may be used for patch installation, patch uninstallation and other transactions performed by the installer program module 37, such as advertised (i.e., available but not installed) features, patch on demand, and repair.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method of creating patch rollback script records for restoring an electronic system to an original state for use in the event an error, a failure, or a user cancellation occurs when patching an application program module in the electronic system, comprising:

analyzing a patch script record, wherein the patch script record corresponds to a patching operation;

generating a rollback script record suitable for restoring an electronic system to an original state in the event a failure or error occurs when the patch script record is executed based on the analysis of the patch script record; and determining whether a version of a file to be patched already exists on the electronic system; and if a version of the file to be patched does not already exist on the electronic system, storing a first set of instructions as the patch rollback script record, wherein the first set of instructions describe a plurality of steps necessary to reverse the patching operation of the patch script record.

2. The method of claim 1, wherein the file to be patched is a data file.

3. The method of claim 1, further comprising:

if a version of the file to be patched already exists on the electronic system, storing the existing file to be patched in another location on the electronic system; and storing a second set of instructions as the rollback script record, wherein the second set of instructions describes a plurality of steps necessary to copy the existing file to be patched to its prior location on the electronic system and the steps necessary to reverse the patching operation of the patch script record.

4. The method of claim 1, further comprising:

determining whether the patching operation is complete; and if the patching operation is not complete, analyzing the next patch script record and repeating the method.

5. The method of claim 4, further comprising:

if the patching operation is complete, purging all patch rollback script records and back-up files from the electronic system.

6. The method of claim 1, further comprising:

providing a user interface for use in association with patching an application program module on a computer, wherein the user interface is displayed to a user and includes a rollback bar comprising a number of level indicators, wherein a level indicator is removed to indicate that the patch program module is restoring the computer to its state prior to the patch program module patching the application program module.

7. The method of claim 6, wherein the level indicators are removed from the right side of the rollback bat until the level indicators are no longer displayed in the rollback bar, indicating that the computer has been restored to its state prior to patching the application program module.

8. The method of claim 6, wherein the level indicators are generally rectangular.

9. A computer-readable medium having computer-executable instructions for performing the method recited in any one of claims 1–8.

10. A method for determining whether to enable or disable an aspect of creating patch rollback script records for a computer comprising an installer program module for installing a patch to an application program module using a plurality of patch installation script records and for creating patch rollback script records and backed-up patch rollback files for restoring the computer to an original state, the method comprising:

determining the storage cost of patching the application program module and the cost of storing the patch rollback script records and backed-up patch rollback files;

determining whether the storage cost of patching the application program module and the cost of storing the patch rollback script records and backed-up patch rollback files are greater than the available disk space of the computer; and if the storage cost of patching the application program module and the cost of storing the patch rollback script records and backed-up patch rollback files are not greater than the available disk space of the computer, patching the application program module while storing the patch rollback script records and backed-up patch rollback files.

11. The method of claim 10, further comprising:

if the storage cost of patching the application program module and the cost of storing the patch rollback script records and backed-up patch rollback files are greater than the available disk space of the computer, determining the storage cost of patching the application program module;

determining whether the storage cost of patching the application program module is greater than the available disk space of the computer; and if the storage cost of patching the application program module is greater than the available disk space of the computer, displaying a message indicating that the application program module cannot be patched because there is insufficient available disk space.

12. The method of claim 10, further comprising:

if the storage cost of patching the application program module is not greater than the available disk space of the computer, displaying a message indicating that the application program module can be patched if the patch rollback script records are disabled;

receiving an indication to disable the patch rollback script records; and patching the application program module.

13. A computer-readable medium having computer-executable instructions for performing the method recited in any one of claims 10–12.

14. A method of creating patch rollback script records for restoring an electronic system to an original state for use in the event an error, a failure, or a user cancellation occurs when patching an application program module in the electronic system, comprising:

analyzing a patch script record, wherein the patch script record corresponds to a patching operation that does not include a rollback operation;

automatically generating a rollback script record based on the analysis of the patch script record, wherein the rollback script record is suitable for restoring the electronic system to an original state in the event that the execution of the patch script record prematurely terminates; determining whether a version of a file to be patched already exists on the electronic system; and if a version of the file to be patched does not already exist on the electronic system, storing a first set of instructions as the patch rollback script record, wherein the first set of instructions describe a plurality of steps necessary to reverse the patching operation of the patch script record.

15. A computer-readable medium having computer-executable instructions for patching an application program module on a computer and restoring the computer to its original state before the patching of the application program module, which when executed performs steps comprising:

performing an operation for patching an application program module on the computer;

storing on the computer an instruction for reversing the patching operation;

detecting an error in the patching operation;

in response to detecting the error, executing the instruction; and providing a user interface for use in association with patching an application program module in a computer, wherein the user interface is displayed to a user and includes a rollback bar comprising a number of level indicators, wherein a level indicator is removed to indicate that the patch program module is restoring the computer to its state prior to the patch program module patching the application program module.

16. The computer-readable medium of claim 15, further comprising instructions, which when executed perform the step of storing the instruction in a rollback script.

* * * * *

UNITED STATES PATENT AND TRADEMARK OFFICE
CERTIFICATE OF CORRECTION

PATENT NO. : 6,438,749 B1
DATED : August 20, 2002
INVENTOR(S) : B.C. Chamberlain It is certified that error appears in the above-identified patent and that said Letters Patent is hereby corrected as shown below:

Column 6,
Line 26, "disk 31 A" should read -- disk 31A --

Column 10,
Line 52, "2.0.1" should read -- 2.0.1 --

Column 16,
Lines 29-30, 34-35, 47-48, 55-56 and 64-65,
"PROM-
TROLLBACKCOST" should read -- PROMPT-
ROLLBACKCOST --

Column 19,
Line 51, "rollback bat" should read -- rollback bar --

Signed and Sealed this

Twenty-eighth Day of January, 2003

JAMES E. ROGAN
*Director of the United States Patent and Trademark Office*